United States Patent Office 3,431,161
Patented Mar. 4, 1969

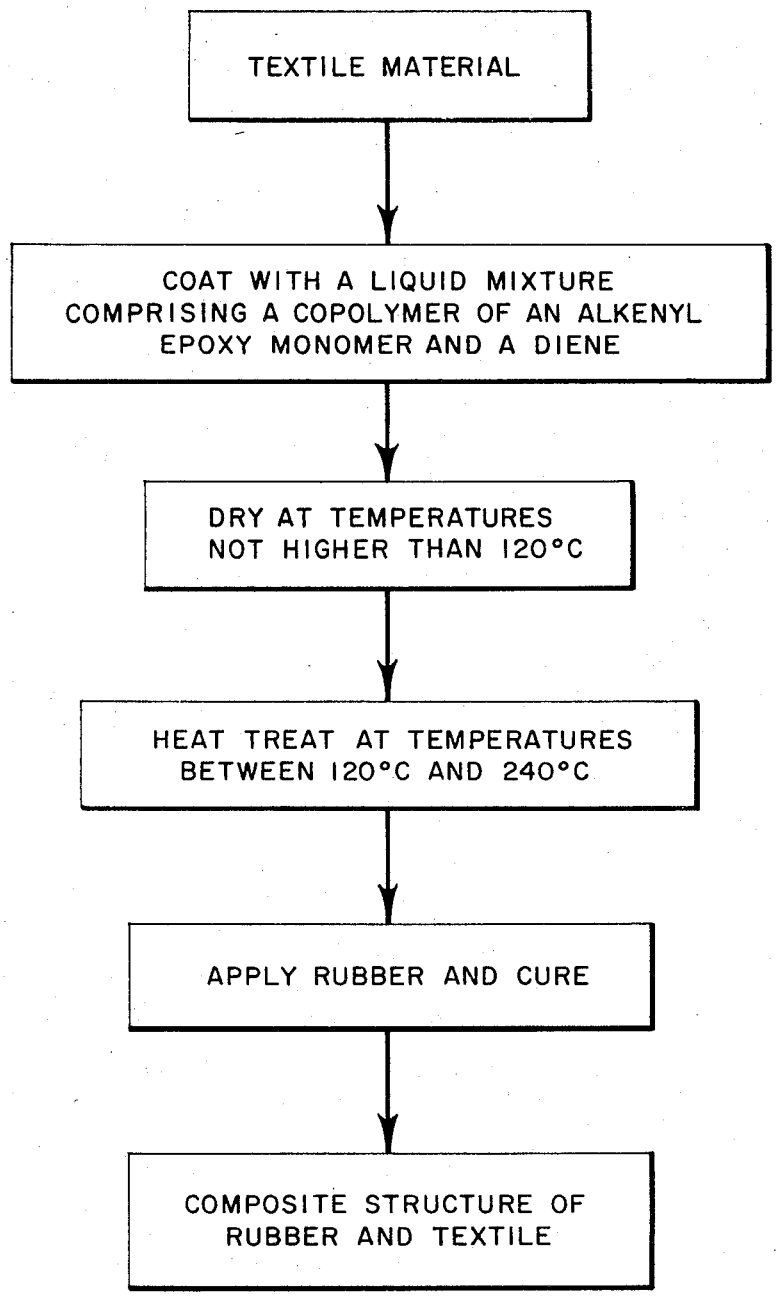

3,431,161
METHOD OF BONDING SYNTHETIC FIBER MATERIALS TO RUBBERS
Bernardino Vecellio, Milan, Italy, assignor to Pirelli S.p.A., Milan, Italy
Filed Mar. 4, 1964, Ser. No. 349,470
Claims priority, application Italy, Mar. 12, 1963, 5,170/63
U.S. Cl. 156—330
Int. Cl. C09j 5/02
24 Claims

ABSTRACT OF THE DISCLOSURE

A textile reinforcing material is contacted with a liquid mixture containing an unsaturated epoxy copolymer having pendent epoxy groups, said copolymer having been obtained by free radical copolymerization of at least one conjugated diene with at least one alkenyl epoxy monomer. The impregnated textile material is dried to partially cross link the epoxy groups to the textile material, contacted with rubber stock, and the composite structure is vulcanized.

---

The present invention relates to a process for treating widely differing types of textile materials, having different physical and chemical nature or structure and being in the form of fibers, threads, yarns or fabrics, with liquid compositions comprising unsaturated epoxy copolymers, in order to improve the bonding of said textile materials to compositions based on natural and/or synthetic rubber.

In the manufacture of rubber articles, as for instance pneumatic tires for vehicles, V-belts, conveyor belts, and in general in the production of all rubber articles for which it is necessary to provide a reinforcement, in particular by the insertion of textile materials in the form of threads, cords, fabrics and the like, it is necessary to ensure a bond as firm as possible between said materials and the rubber compositions in order that the reinforcement may be satisfactory and the useful life of the article may be as long as required.

In view of the introduction and progressive development for the above indicated purposes of textile materials based on artificial and synthetic fibers which, because of their better physical properties, have advantageously replaced cotton, it has been necessary to find a way for achieving the bonding of these textile materials to rubbers by means of special methods, never used before, owing to the fact that said new textile fibers have a structure different from that of cotton fiber which permits per se good mechanical bonding.

As is known, in the case of fibers of regenerated cellulose, as for instance rayon, and subsequently of polyamidic fibers, constituted by polyhexamethyleneadipamide, polycaprolactam and the like, the problem of adhesion to rubber was solved in a way which can be considered as satisfactory, namely by using resins of the resorcinol-formaldehyde type which, at a suitable condensation degree, are introduced in latices of various rubbers in order to provide suitable systems of bonding agents. Such agents are then used for the impregnation of the textile materials to which the resorcinol resin, highly condensed in situ by means of heat treatment subsequent to the impregnation, adheres strongly, whereas bonding to the rubber composition during vulcanization is obtained by means of the rubbers contained in the latices, said rubbers being retained on the textile material by virtue of mechanical entanglement of them with the resins.

However, bonding agents based on latices containing resorcinol-formaldehyde resins have not proved successful in obtaining a satisfactory bond between rubber compositions and fibers of polyester resin, as for instance those constituted by polyethylene-terephthalate, polyethylene-isophthalate and the like. The unsatisfactory solution of the problem of their bonding to rubbers has for a long time prevented these textile fibers, of great interest in other aspects, from being utilized in the production of the above indicated articles having a composite structure. In fact, the only means of achieving such bonding was heretofore provided by the use of organic diisocyanates and polyisocyanates which, however, proved quite unsuitable for industrial processing owing to various reasons, among which are the need for organic solvents, more or less inflammable and expensive, the high sensitivity of the isocyanic groups to moisture, the high degree of toxicity of the products, etc. These drawbacks were eliminated by the adoption of blocked diisocyanates but, even if the treatment with isocyanates offers generally good bonding values of the polyester fibers to the rubbers in static conditions, said bond falls to very low values under dynamic conditions, i.e. under repeated stresses because of the considerable stiffness of the condensation products of the isocyanates, which constitute the element through which the bonding is carried out.

Some processes intended to obtain bonding by means of the use of epoxy resins have been recently proposed. The adhesive properties of said resins to surfaces of various materials are well-known; in fact, they adhere satisfactorily to polyester fibers, but do not adhere to the rubber compounds during vulcanization. Therefore, various bonding systems, based on the use of mere mixtures of said resins with various rubbers, have been proposed. One of said systems consists substantially of the application to textile materials of mixtures of epoxy resins, in particular polyglycidic ethers of aliphatic poly-alcohols, in aqueous dispersion with rubber latices followed by the application of mixtures of rubber latices with agents capable of cross-linking the epoxy resins.

As regards the mechanism, the process based on said bonding system does not substantially differ from the one carried out with the use of resorcinol-formaldehyde resins, which in this case are replaced by the epoxy resins.

Another of said systems substantially consists of first applying to the polyester fibers a coat of epoxy resin based on polyglycidic ethers of aliphatic poly-alcohols and producing the cross-linking of the latter, and then in further treating the fibers with mixtures of rubber latices and resorcinol-formaldehyde resins similar to those employed for rayon and polyamide fibers.

An object of the present invention is to provide a process for improving the bonding between rubber compositions and reinforcing textile materials, the latter being of various types, but in particular being based on regenerated cellulose, polyamidic and polyester resins, characterized by the fact that it is carried out by using, as bonding agents, copolymers containing in their molecules both epoxy groups which, after cross-linking, adhere strongly to the surface of the textile materials, and double bonds between carbon atoms which allow covulcanization with the rubbers to be bonded. Therefore, the bonding can be effected without the use of epoxy resins of known type or of resorcinol-formaldehyde resins.

A further object of the present invention is to provide composite structures and articles of rubber reinforced with textile materials treated according to said process.

The advantages of using as bonding agents substances containing functional groups having affinity with those of both materials to be bonded, instead of employing mechanical mixtures of resins and rubbers, more or less compatible with one another, are clearly evident.

The unsaturated epoxy copolymers which may be used in the present invention and methods for their preparation are disclosed in copending applications Ser. Nos. 331,953 filed Dec. 19, 1963 and 334,630 filed Dec. 30, 1963, the latter application being now abandoned, in the name of the present applicant which disclosure is hereby incorporated by reference.

Referring to the drawing, the sole figure is a flow sheet illustrating the process of the invention.

In a preferred embodiment of the present invention the reinforcing textile material for composite structures constituted by rubber and textile material, the bonding of which to the rubber is to be improved, is subjected to a treatment comprising the operation of impregnating said textile material, before its bonding to the rubber, with at least a single liquid mixture comprising an unsaturated epoxy copolymer comprising in its structure monomeric units having double bonds between carbon atoms and monomeric units having pendent epoxy groups and in some cases also monomeric units devoid of double bonds between carbon atoms and of epoxy groups, said copolymer being obtained by the free-radical copolymerization, in a substantially neutral medium, of at least one conjugated diene monomer with at least one alkenyl monomer containing epoxy groups, said epoxy groups, after copolymerization, being pendent with respect to the molecular chain of the obtained copolymer, and in some cases with at least one further alkenyl monomer devoid of epoxy groups, the monomeric units comprised in the structure of said copolymer being present in the ratio by weight of copolymer ranging between 2% and 95% with respect to the monomeric units containing double bonds between carbon atoms, between 5% and 60% with respect to the monomeric units containing epoxy groups and, when present, in the ratio by weight between 0.1% and 40% with respect to the monomeric units devoid of double bonds between carbon atoms and of epoxy groups, said operation being carried out in such a way that the amount of unsaturated epoxy copolymer applied on the textile material, after drying, is between 0.4% and 20% based on the total weight of the textile material.

Copolymers having the above indicated structure can be, for instance, obtained by free-radical copolymerization of (a) at least one conjugated diene monomer selected from among 1,3-butadiene and its homologues, as isoprene and 2,3-dimethylbutadiene, and chloroprene, with (b) at least one alkenyl epoxy monomer, selected from among the glycidic esters of unsaturated acids, such as acrylic, alpha - chloroacrylic, alpha - methylacrylic and alpha-ethylacrylic acids, and the epoxyalkyl ethers of the alkenyl-phenols, as the glycidic ethers of the ortho-, meta-, para - vinylphenol and ortho - isopropenylphenol, and in some cases with (c) at least one non-epoxy alkenyl monomer selected from among styrene and its homologues, alkyl esters of the acrylic and alpha-methylacrylic acids and alkylvinyl ethers. Other monomers of this latter type, which may advantageously take part in the copolymerization, as will be indicated hereinafter, are acrylic, alpha-chloroacrylic, alpha - methylacrylic, alpha - ethylacrylic, alpha - propylacrylic and alpha - butylacrylic acids, vinylpyridines and their homologues.

These unsaturated epoxy copolymers can be obtained in aqueous emulsion, in the form of a latex, or in the form of a solution in an organic solvent. When prepared in aqueous emulsion, said copolymers can be very tough elastomers of high molecular weight. The best results are obtained by employing, as bonding agents between the textile materials and the rubber, copolymers in emulsion having an intrinsic "Vistex" viscosity, evaluated following the D. A. Henderson and N. R. Legge's method (Canadian Journal of Research, 1949, B.27, page 666) at 30° C. in a toluene-isopropanol mixture (80:20 parts by volume) ranging between 0.1 and 5 100 ml./g. and preferably between 0.2 and 3 100 ml./g.

The copolymerization in aqueous emulsion, carried out in order to obtain the desired copolymers, is effected, with a free-radical mechanism, at a temperature ranging between 5° C. and 60° C., and at a pH between 6 and 8 in order to avoid the opening of the epoxy rings of the alkenyl monomers containing them. In order to maintain the emulsion at a pH within the above indicated range, the emulsifiers used are alkaline salts of acids selected from the group consisting of alkylsulphonic, arylsulphonic, alkylarylsulphonic acids, as for instance the product sold by E. I. du Pont de Nemours & Co. under the trademark of Aquarex D (mixture of sulphonated fatty alcohols), the product sold by Badische Anilin und Soda Fabrik A.G. under the trademark of Nekal BX (sodium alkylnaphthalenesulphonate) and the product sold by Rohm & Haas Co. under the trademark of Tamol N, known in Europe as Orotan N (sodium salt of alkylnaphthalenesulphonic acid polycondensed with formaldehyde).

In aqueous solution these products have a slightly alkaline pH, act also in a slightly acid medium and permit therefore the adjustment of the pH of the solution to a value near the neutral point by means of the addition of a small amount of a weak acid, as for instance acetic acid in diluted aqueous solution or, vice versa, by means of the addition of an alkali in aqueous solution, when comonomers of acid nature, as the acrylic and methylacrylic acids, are used.

The suggested copolymerization initiating system is a system of the "Redox" type, comprising an organic hydroperoxide and sodium formaldehyde-sulphoxylate. Isopropylbenzene-hydroperoxide is generally employed; however, equally good results and still higher polymerization rates may be obtained by using as initiating agents other organic hydroperoxides, such as diisopropylbenzene and paramenthane hydroperoxides.

As molecular weight modifiers the xanthogen disulphides, and in particular the diisopropylxanthogen disulphide, are used. For the sake of simplicity, in the following description isopropylbenzene hydroperoxide and diisopropylxanthogen disulphide will be respectively indicated with the letters CHP and DPXD.

The unsaturated epoxy copolymers prepared by copolymerization in aqueous emulsion at the desired conversion rate may be directly used in the form of latices in the preparation of liquid mixtures (of which they may be in some cases the only components) to be employed for the impregnation, after having been subjected to stabilization, elimination of the non-reacted amounts of monomers and concentration or dilution to the desired solids content, according to the usual practice for the production of synthetic rubber latices. The obtained latices must have in any case a pH ranging between 6 and 8.

This way of processing, although it represents a preferred form of employment of unsaturated epoxy copolymers obtained in emulsion as bonding agents between the textile materials and the rubber, is not the only possible method, since said copolymers may also be used in solution in organic solvents, after coagulating the latices with neutral coagulants or after evaporating the aqueous phase.

Copolymerization in solution in inert organic solvents, which may also be adopted to obtain the desired copolymers, is carried out, with a free-radical mechanism, in an atmosphere of an inert gas, such as nitrogen, at a temperature between 50° C. and 140° C. By operating under these conditions, the opening of the epoxy rings of the alkenyl monomers containing them is avoided.

Aliphatic, cycloaliphatic and aromatic hydrocarbons such as normal heptane, cyclohexane and benzene, are suitably used as inert organic solvents.

As initiating agents of the copolymerization in solution, it is possible to use all those compounds the decomposition of which allows the formation of free radicals, and in particular the organic peroxides, e.g. di-tert-butyl peroxide, dicumyl peroxide, and especially di-benzoyl peroxide.

The unsaturated epoxy copolymers prepared by copolymerization in solution in organic solvents at the desired conversion degree are generally separated by precipitation from the solvents in order to carry out their purification, and are employed for the preparation of liquid mixtures after having been again dissolved in suitable organic solvents, the obtained solution being capable, alone, of forming the mixture for the process in accordance with the present invention.

Both in the present description and in the examples and in the claims, the expression "copolymers" is used in its widest signification to indicate polymers constituted by monomeric units of several types, therefore including also the polymers usually called terpolymers, tetrapolymers, etc.

According to the alternative embodiment of the process forming the object of the present invention, inpregnation of the textile material is carried out by means of a single liquid mixture comprising, besides the unsaturated epoxy copolymer, at least one cross-linking agent and other possible further ingredients and additives. According to another alternative embodiment, said operation is carried out by means of a plurality of liquid mixtures, at least one of which comprises at least a part of the unsaturated epoxy copolymer and at least one of which comprises at least a part of at least one cross-linking agent and of other possible ingredients and additives.

According to another alternative embodiment, the impregnation may also be carried out by causing the textile material to pass more than once through the liquid mixture or mixtures. In all cases said impregnation may be made by dipping the textile material into the bath or baths containing the liquid mixtures or by means of any other operation, as well known in modern technology, as for instance by spreading or spraying.

The cross-linking agents in the liquid mixture or mixtures are substances having a chemical functionality such as to be able to carry out a cross-linking action either on the epoxy groups or by means of the double bonds of the unsaturated epoxy copolymer. Among the substances acting on the epoxy groups, amine compounds and organic anhydrides, in any case having a double or multiple functionality, which are conventionally known as "hardeners" of epoxy resins, are preferably used. In particular, among the amine substances mention is made of orthodimethylaminomethylphenol, metaphenylenediamine, metatoluylenediamine, hexamethylenediamine, diethylenetriamine, triethylenetetramine, triethanolamine, dicyandiamide, melamine, benzoguanamine, benzidine, tolydine, dianisidine, diaminodiphenylmethane and diaminodiphenylsulphone. The total of said cross-linking agents is used in a ratio up to 30% by weight based on the total content of the unsaturated epoxy copolymer. Alternatively, or in addition to the substances already known per se as hardening agents, also copolymers comprising monomeric units derived from monomers selected from among vinylpyridines and their homologues may form part of the liquid mixture or mixtures; in particular they may be copolymers of elastomeric type known as vinylpyridine rubbers, the structure of which comprises also monomeric units derived from conjugated dienes, and in some cases from styrene. The combined use of said copolymers, besides being suitable for their known intrinsic adhesive properties, is particularly advantageous for the cross-linking action exerted on the epoxy groups by the tertiary base pyridine nuclei, contained in the corresponding monomeric units. The total of said copolymers may be in a ratio up to 70% by weight based on the total content of the unsaturated epoxy copolymer. The same unsaturated epoxy copolymer may comprise in its structure monomeric units having a chemical functionality such as to be able to carry out a cross-linking action on at least a part of the epoxy groups, said monomeric units being derived from at least one non-epoxy alkenyl monomer having said chemical functionality. As already said, these monomers are selected from a group constituted by acrylic, alpha-chloroacrylic, alpha-methylacrylic, alpha-ethylacrylic, alpha-propylacrylic and alpha-butylacrylic acids, and by the vinylpyridines and their homologues. It is understood that, even when monomeric units having a cross-linking action are present, also substances already known per se as hardening agents, and in some cases also the above described vinylpyridine copolymers, may be included in the liquid mixture or mixtures.

Among the cross-linking agents are included also substances having a chemical functionality such as to be able to carry out a cross-linking action by means of the double bonds of the unsaturated epoxy copolymer. These substances, used in addition to those indicated above, are the substances per se already known as vulcanizing agents of unsaturated elastomers, such as sulfur, and are used in amounts up to 10% by weight based on the total content of the unsaturated epoxy copolymer. At least one other substance, selected from among those per se already known as accelerators and coadjutant of vulcanization—including in the latter group zinc oxide—may be added to the above indicated substances, the total of said accelerators being present in a ratio up to 5% by weight based on the total content of the unsaturated epoxy copolymer, and the total of said coadjuvants being present in a ratio up to 25% by weight based on the total content of the unsaturated epoxy copolymer.

Said vulcanizing agents, accelerators and coadjutant, if not directly included in the liquid mixture or mixtures, may in some cases migrate from the rubber compositions to be bonded, after the association of the latter with the textile material on the residual layer previously applied so that they may carry out their cross-linking action during the heat treatment intended to vulcanize the composite structure.

The liquid mixture or mixtures may also include additives among which there are especially included polymeric substances of elastomeric type, in particular natural rubber and conventional unsaturated synthetic rubbers, the total of said rubbers being in a ratio up to 50% by weight based on the total content of the unsaturated epoxy copolymer. These additives also may comprise polymeric resinous substances, in particular phenolic, epoxy and polyamidic resins, the total of said resins being in a ratio up to 30% by weight based on the total content of the unsaturated epoxy copolymer.

In the liquid mixture, or in some cases in the various liquid mixtures, the unsaturated epoxy copolymer may be in dispersion in an aqueous medium in which case the possible water-insoluble cross-linking agents and other possible water-insoluble ingredients and additives, which have to take part in the formation of said mixtures, are in dispersion in an aqueous medium and the possible water-soluble cross-linking agents and other possible water-soluble ingredients and additives which have to take part in the formation of said mixture or mixtures, are in solution in an aqueous medium, the pH of each single dispersion and solution in aqueous medium, before their mixing to form the liquid mixture, being in a range between 6 and 8.5. Alternatively, the unsaturated epoxy copolymer may be in solution in an organic medium, in which case the possible cross-linking agents and the other possible ingredients and additives which have to take part in the formation of said liquid mixture or mixtures are added, in solution or in dispersion, in an organic medium compatible with the preceding one, to form the liquid mixture.

In the case of liquid mixtures prepared in aqueous medium which, besides comprising the unsaturated epoxy copolymer in the form of latex, also comprise copolymers, in particular elastomeric copolymers such as natural rubber, the conventional unsaturated synthetic rubbers and the copolymers comprising monomeric units derived from vinylpyridine monomers, also in the form of latex, it is necessary to adjust the pH of said copolymers in the range between 6 and 8.5, if originally the pH is outside this range. This may be suitably accomplished by small additions of a diluted weak acid, such as acetic acid, to the latex stabilized with a non-ionic emulsifier of the type comprised by condensation products of cyclic olefinic oxides, such as ethylene oxide and propylene oxide, with hydroxylated compounds, such as oleic alcohol.

According to the process of the present invention, the other possible liquid mixtures, not comprising the unsaturated epoxy copolymer, which take part in the impregnating operation, may be formed in either of the two media, water and organic solvent, independently of the medium in which the liquid mixture containing the copolymer is formed, the pH of these other possible liquid mixtures, when they are in the form of aqueous dispersion, having any value whatsoever.

An alternative embodiment of the process in accordance with the present invention comprises the steps of causing the textile material to pass through a single liquid mixture containing the copolymer and all the other possible cross-linking agents, ingredients and additives, said liquid mixture being prepared as above described, the concentration of the mixture, the traveling speed of the textile material and the stretch of said textile material its travel through the mixture being such that the dry residue applied on the textile material is between 1% and 20% by weight based on the total content of the textile material, preferably between 2% and 10%, said dry residue being constituted in an amount of at least 40% by an unsaturated epoxy copolymer, and of drying the textile material, in some cases under tension, so as to obtain practically total elimination of the liquid medium, at temperatures not higher than 120° C.

A further alternative embodiment of the process of the present invention comprises the steps of causing the textile material to pass through a plurality of liquid mixtures of which at least the first comprises at least a part of the total epoxy copolymer employed and at least another comprises at least a part of at least one of the cross-linking agents and of the other possible ingredients and additives, and of drying said textile material after passage through each mixture so as to obtain at least a partial elimination of the liquid medium in order to prevent the applied residue from dispersing again in subsequent liquid mixtures and of carrying out a further drying action after passage through the final liquid mixture so as to obtain practically total elimination of the liquid media, said drying operations being carried out at temperatures not higher than 120° C. and in some cases while keeping the textile material under stretch the concentrations of all the liquid mixtures and the travelling speed of the textile material in the mixtures and the stretching of said material during its passages through said mixtures being such that the total dry residue applied on the textile material is between 1% and 20% based on the weight of the textile material, preferably between 2% and 10%, said dry residue being constituted in an amount of at least 40% by the unsaturated epoxy copolymer.

Besides the concentration of the liquid mixtures, the travelling speed of the textile material passing through them and the stretching of said material which, as is known, affect the amount of the residue applied on the textile material, other factors such as the addition of wetting agents may influence said amount; however, these factors must not have a substantial modifying action on the pH of the mixtures comprising the unsaturated epoxy copolymer.

In the two above indicated alternative embodiments of the process, the drying operation conducted in order to obtain the practically total elimination of the liquid medium may be followed by a heat treatment at a temperature in the range between 120° C. and 240° C. for a time in the range between 0.5 and 30 minutes in order to obtain at least partial cross-linking of the epoxy groups on the textile material carried out, if desired, while maintaining the textile material under stretch.

The drying operation for the substantially total elimination of liquid medium and the heat treatment for at least partial cross-linking of the epoxy groups may be carried out in a single step. If the second treatment is not effected, a sufficient cross-linking of the epoxy groups on the textile material will take place during the heat treatment necessary for the vulcanization of the assembly formed with the rubber composition to be bonded, which heat treatment will be hereinafter described.

The textile materials, before their association with the rubber compositions, must generally be subjected to mechanical operations at more or less high temperatures under conditions varying according to their nature. These operations substantially consist of imparting to the textile materials a pre-established stretch in order to improve their mechanical characteristics and then, when necessary, a controlled shrinkage in order to achieve dimensional stability. Said operations, when required, may be advantageously carried out, completely or partially, during the heat treatment imparted to the textile material in order to carry out the drying and at least partial cross-linking of the epoxy groups.

The textile materials treated as described above have a scarcely tacky surface, in particular when the amount of dry residue on the applied adhesive is not relevant, and are very well suited for the subsequent mechanical operations since they do not tend to deposit any gummy material on the rolls of the machines.

From the above description, one may note that considerable advantage deriving from the ease with which the process can be utilized in common operations without having to change conventional machinery.

The so treated textile materials are placed into contact with the rubber compositions and the obtained assembly is subjected to a curing heat treatment during which cross-linking of the unsaturated epoxy copolymers is completed and covulcanization of said cooplymers and of the other rubbers in the event they are contained in the liquid mixtures with the rubber or rubbers contained in the composition to be bonded is effected. In view of the fact that cross-linking of the unsaturated epoxy copolymers may be effected both through the double bonds between carbon atoms, namely by means of sulfur and accelerators, and through the epoxy groups so that said cross-linking may be also achieved by combined use of the two different systems, it is possible to achieve a very good bond during vulcanization between said copolymers and the known unsaturated rubbers vulcanized by means of the double bonds, namely with sulfur and accelerators.

In general, the compatibility between the dry residue of the liquid mixtures applied on the textile material and the compositions to be bonded is equally good whether the liquid mixtures contain only cross-linking agents acting on the epoxy groups or only cross-linking agents acting on the double bonds between carbon atoms, and moreover when they contain at the same time cross-linking agents of both types and also when said mixtures contain no cross-linking agents in the event that these, present in the composition to be bonded, may migrate from the latter during the heat curing treatment.

The process in accordance with the present invention relates to all textile materials. Preferably, it concerns textile materials constituted by regenerated cellulose, polyamide or polyester resins.

The process improves in a satisfactory manner the bond of textile materials to rubber compositions both when these compositions are based on natural rubber and when they are based on synthetic polyisoprene, butadiene-styrene rubbers of the oil-extended type or of the normal type, polybutadienes having various 1,4-cs form contents, polymers and copolymers of chloroprene, nitrile rubbers having various contents of acrylonitrile, and other rubbers having a high degree of unsaturation, and furthermore when the compositions are based on more than one of the above indicated rubbers. Moreover, they may have very different compositions with respect to the other ingredients.

The distinction between highly unsaturated and low unsaturated rubbers is well known in the art; for example, see the U.S. Patent to Ernst et al. No. 3,106,950.

The process may also be applied to the bonding of textile materials to compositions based on rubbers having a low degree of unsaturation such as butyl rubber provided that in the unsaturated epoxy copolymer the unsaturation content is approximately equal to that of the rubber or rubbers used in the rubber layer to be bonded so as to ensure a good covulcanization of said copolymer with the rubber or rubbers.

The textile materials treated in accordance with the process of the present invention may be used in the preparation of composite structures of rubber and textile materials in products of various types. For instance, they may find application in the rubberizing of carcass plies, of breaker strips and of other elements to be used in the manufacture of pneumatic tires, as well as in the rubberizing of plies and threads used in the manufacture of flat, V- and toothed belts, conveyor belts, tubes and the like.

For a better understanding of the above described process, some non-limiting examples illustrating embodiments of the present invention are reported herebelow. In this connection it is pointed out that in the polymerization formulations and in the formulations for the preparation of adhesive compositions parts are always given by weight.

EXAMPLE 1

This example shows the possibility of obtaining a very good bond between textile materials and compositions of natural rubber by using as the bonding agent a single liquid mixture comprising an unsaturated epoxy copolymer derived from copolymerization in solution in an inert organic solvent of a conjugated diene monomer, isoprene, with an alkenyl monomer containing an epoxy group, the glycidyl ether of orthvinylphenol. Said coyolymer has a relatively low molecular weight.

The liquid mixture is a solution comprising, besides this copolymer, a hardening agent of epoxy resins and a solvent.

The textile material which is impregnated with said mixture is constituted by regenerated cellulose of the "high tenacity" rayon type.

The polymerization formulation used to obtain the copolymer as indicated above is the following:

| | Parts |
|---|---|
| Isoprene | 15 |
| Glycidyl ether of ortho-vinylphenol | 15 |
| Benzene | 25 |
| Dibenzoyl peroxide | 2 |

The two monomers together with benzene as a solvent are charged into a pressure-resistant polymerization flask. Then 0.5 part of dibenzoyl peroxide are added, air is expelled by means of oxygen-free nitrogen, the mixture is stirred and is heated at a temperature of 70° C. Further additions of 0.5 part of dibenzoyl peroxide, each dissolved in 3 parts of benzene, are made 40, 65 and 80 hours later. After 96 hours the polymerization reaches a conversion of 76% and the resulting copolymer formed by simple addition concerning the double bonds between carbon atoms and not by opening of the epoxy rings is precipitated with ethyl alcohol from the benzene solution. Said copolymer is constituted by a viscous liquid having a honey-like consistency at room temperature.

As it is completely soluble in ethyl ether, in which the homopolymer of the glycidyl ether of the ortho-vinylphenol is insoluble, it is shown that no formation of this homopolymer has taken place.

The content of epoxy monomeric units present in the copolymer, evaluated by titration with hydrochloric acid, is 34% based on the total weight of the copolymer.

The intrinsic viscosity in benzene at 30° C. of the obtained copolymer is 0.274 100 ml./g.

Two solutions are prepared by taking 10 parts by weight of copolymer, obtained as above described, and 70 parts of benzene; then 1 part by weight of ortho-dimethylaminomethylphenol in 20 parts of isopropanol (test 1A) and 1 part by weight of metaphenylenediamine, also in 20 parts of isopropanol (test 1B) are respectively added as hardening agents.

The impregnation of the textile material with said solutions is carried out by passing into one or the other solution, and in every case with a single dipping operation, lengths of twisted high tenacity rayon (count denier 1650 x 2, 48 x 48 SZ twists per dm.) which are then held for 5 minutes in air at 170° C. Then specimens for the adhesion tests are prepared and vulcanized both with one length of twisted untreated rayon and with two lengths of twisted rayon, each treated with one of the two solutions.

The specimen is constituted by a block of rubber composition of cubic shape inside which, in axial position and projecting from the rubber, the twisted yarn is embedded before curing.

The specimen is vulcanized, the twisted yarn being kept under a slight stretch. The contact surface in which the bond between the twisted yarn and the rubber composition occurs corresponds to a length of 1 cm., which is just the length of the twisted yarn embedded in the rubber composition.

The rubber composition to be bonded has the following composition:

| | Parts |
|---|---|
| Natural rubber | 100 |
| Furnace black | 37 |
| Zinc oxide | 5 |
| Stearic acid | 3 |
| Pine tar | 3 |
| Dibenzothiazyl disulphide | 1.2 |
| Phenylbetanaphthylamine | 1.4 |
| Sulfur | 2.8 |

The specimens are vulcanized at a temperature of 143° C. for 60 minutes.

The hardness of the vulcanized rubber composition is 60 Shore A.

The bond between the textile material and the rubber is evaluated by determining the force required to pull away axially the twisted yarn from the rubber part of the specimen by means of a dynamometer at room temperature. This force is called axial "pulling force."

The values of the load reported in the following table are the average results of 10 tests:

| Twisted rayon yarn: | Pulling force (kg.) |
|---|---|
| Untreated | 4.2 |
| Treated according to 1A | 9.3 |
| Treated according to 1B | 10.4 |

EXAMPLE 2

This example shows the possibility of obtaining a very good bond between textile materials and natural rubber compositions by using two liquid mixtures, one of which comprises as a bonding agent an unsaturated epoxy copolymer derived from polymerization in aqueous emulsion of a conjugated diene monomer, butadiene, with an alkenyl monomer containing an epoxy group, glycidyl acrylate, and with a non-epoxy alkenyl monomer, styrene.

The liquid mixture comprising the copolymer is an aqueous dispersion containing, besides the latex of said copolymer as it comes from polymerization, also some ingredients for the vulcanization of the unsaturated rubbers and more precisely sulfur and zinc oxide. The liquid mixture not containing said copolymer is an aqueous dispersion constituted by butadiene-styrene rubber latex, vinylpyridine rubber latex and zinc oxide, and also contains, in solution in the aqueous phase, a hardening agent for the epoxy resins.

The textile material which is impregnated with said mixtures is constituted by a polyamide.

The polymerization formulations used to obtain unsaturated epoxy copolymers as indicated above are the following:

| Test | 2A | 2B |
|---|---|---|
| Butadiene | 60 | 47.5 |
| Styrene | 15 | 15 |
| Glycidyl acrylate | 25 | 37.5 |
| Water | 180 | 180 |
| Aquarex D | 4 | 4 |
| Tamol N | 0.25 | 0.25 |
| DPXD | 0.06 | 0.06 |
| CHP | 0.21 | 0.21 |
| Rodite A [1] | 0.2 | 0.2 |

[1] Sodium formaldehydesulphoxylate from Montecatini, Compagnia Generale per l'Industria Mineraria e Chimica.

The operation is carried out as follows: the solution of the emulsifier is prepared by dissolving 4 parts of Aquarex D and 0.25 part of Tamol N in 170 parts of distilled water at room temperature. The pH of this solution (originally 8.4) is brought to 5.2–5.3 with the addition of about 0.2 ml. of 2 N acetic acid. The solution is poured into a pressure container, as for instance a conventional polymerization bottle. The pre-established amounts of styrene and of glycidyl acrylate and subsequently of diisopropylxanthogen disulphide (DPXD), the latter as a 5% heptane solution, are then added; at last butadiene is added in an excess amount and the remaining excess is then eliminated to sweep out the air. The container is stoppered as usual and the desired amounts of isopropylbenzene hydroperoxide (CHP), as a 5% heptane solution, and of Rodite A, as a 2% aqueous solution, are injected through the stopper.

The polymerization is carried out in a thermostatic bath at a temperature of 30° C. In the case 2A, 60% of the total amount of glycidyl acrylate is added at the beginning of the polymerization and the remaining 40% two hours later; one-half of hydroperoxide is also added at the beginning of the polymerization and the remaining half two hours later. In case 2B all the additions are made at the beginning.

After 7 hours, when the conversion degree is 53.2% in case 2A and 58.8% in case 2B, the polymerization is stopped by the introduction into the container of 0.1% based on the total weight of monomers of hydroquinone as a 5% aqueous solution, and then of 1% based on the total weight of monomers of trialkylphenylphosphite, sold under the trademark "Polygard" by Naugatuck Chemical, Division of U.S. Rubber Company, as an aqueous emulsion.

The amounts of monomers which have not reacted are eliminated by vacuum steam distillation, and the resulting latices are brought by subsequent concentration to a solid content of about 23%. Their pH are between 6 and 7.5.

By titration with hydrochloric acid on a sample of latex coagulated by addition of brine, it is ascertained that the obtained copolymers, having the appearance of rather tough elastomers, have a content of glycidyl acrylate of 20.5% in case 2A and of 30% in case 2B, respectively. The intrinsic "Vistex" viscosities at 30° C. in a toluene-isopropanol mixture (80:20 parts by volume) of polymers 2A and 2B are 2.565 and 1.805 100 ml./g., respectively.

The operation of impregnating a twisted polyhexamethylene adipamide yarn is carried out by using either metaphenylenediamine or hexamethylenediamine as hardening agents in the second liquid mixture.

Zinc oxide (6 parts of aqueous dispersion at 50%) and sulfur (1 part of aqueous dispersion at 60%) are added to each of the two latices (100 parts) obtained as above described. The so prepared mixtures are kept under stirring in order to avoid settling of said ingredients and are hereinafter indicated as mixtures M(2A) and M(2B), respectively, based on latices 2A and 2B.

Moreover, two mixtures of latices are other copolymers and of zinc oxide, each containing a different hardening agent, are prepared in the following way: 30 parts of a butadiene-styrene-vinylpyridine copolymer latex, (having a 40% solid content) are added to 30 parts of a butadiene-styrene rubber latex (having a 40% solid content); moreover, in the first case, a solution of 8 parts of metaphenylenediamine in 32 parts of distilled water and, in the other, a solution of 8 parts of hexamethylenediamine, also in 32 parts of distilled water, are added. Furthermore, zinc oxide (6 parts in aqueous dispersion at 50%) is added in both cases and the liquid mixtures are kept stirred to avoid settling. The two above described mixtures will be hereinafter indicated with the letters X and Y.

The polyhexamethyleneadipamide twisted yarn has a count denier 840 x 2 and 50 x 50 ZS twists per dm.

Lengths of the twisted yarn as passed through either mixture M(2A) or mixture M(2B) at a speed of about 3 meters per minute, and a first partial drying of the applied coating is carried out in air at about 60° C. Lengths of the twisted yarn, impregnated in this way with each mixture, are then respectively passed through mixture X (tests M(2A)X and M(2B)X) and through mixture Y (tests M(2A)Y and M(2B)Y).

A heat treatment in air at 180° C. for 10 minutes is then effected in all cases.

The so treated twisted yarns, together with the composition of natural rubber indicated in Example 1, are used to prepare the specimens to be subjected to the "axial pulling" test; said specimens are then vulcanized for 60 minutes at 143° C. By subjecting the specimens to the test at room temperature by means of a dynamometer, the following results (average of ten tests) are obtained:

Test: Pulling force (kg.)
M(2A)X _____ 7.7
M(2A)Y _____ 6.2
M(2B)X _____ 8.1
M(2B)Y _____ 5

Tests effected on the same twisted yarn, not treated with any adhesive, give as a result a mean pulling force of 2.7 kg.

EXAMPLE 3

The same liquid mixtures as in Example 2 are used and the same procedure is followed. The textile material to be impregnated is now constituted by polyethylene terephthalate. It is in the form of a twisted yarn having a count denier 1100 x 2 and 53 x 53 SZ twists per dm.

The results of the axial pulling tests carried out by means of a dynamometer on the specimens prepared with this twisted yarn (average of ten tests) are:

Test: Pulling force (kg.)
M(2A)X _____ 8.7
M(2A)Y _____ 7.9
M(2B)X _____ 9.4
M(2B)Y _____ 8

Tests effected on the same twisted yarn, not treated with any adhesive, give as a result a mean pulling force of 2.5 kg.

EXAMPLE 4

In this example a bonding agent is used, which is an unsaturated epoxy copolymer obtained by copolymerization in aqueous emulsion of butadiene, glycidyl methylacrylate and styrene. The impregnation is effected with two liquid mixtures, the first of which is an aqueous dispersion constituted by the latex of the above indicated copolymer, and the second of which, not containing said copolymer, is an aqueous dispersion constituted by a butadiene-styrene rubber latex, a vinylpyridine rubber latex, zinc oxide and metaphenylenediamine.

The textile to be impregnated is a "high tenacity" rayon.

The polymerization formulations used to obtain unsaturated epoxy copolymers as indicated above, are the following:

| Test | 4A | 4B | 4C |
|---|---|---|---|
| Butadiene | 70 | 60 | 40 |
| Styrene | 15 | 15 | 20 |
| Glycidyl methylacrylate | 15 | 30 | 40 |
| Water | 180 | 180 | 180 |
| Nekal BX | 4 | 4 | 4 |
| Tamol N | 0.25 | 0.25 | 0.25 |
| DPXD | 0.09 | 0.09 | 0.09 |
| CHP | 0.28 | 0.28 | 0.84 |
| Rodite A | 0.2 | 0.2 | 0.2 |

The polymerization is effected as described in Example 2, with the modifications reported hereinafter.

In case 4A, two-thirds and DPXD and CHP are added at the beginning and one-third 16 hours later.

In case 4B, two-thirds of DPXD are added at the beginning and one-third 5 hours later; one-half of CHP at the beginning and one-fourth 4 and 8 hours later, respectively; one-half of glycidyl methylacrylate at the beginning, one-third 5 hours later and one-sixth 8 hours later.

In case 4C one-half of styrene is added at the beginning and one-half 8 hours later. The additions of glycidyl methacrylate are: 30% at the beginning, 20% 4½ hours later and 50% 8 hours later. DPXD is added: two-thirds at the beginning and one-third 4½ hours later. The additions of CHP are: one-third at the beginning and one-sixth 4½, 7½, 24 and 31 hours later.

In case 4A the polymerization is shortstopped after 19 hours when the conversion is 74% and the copolymer has a content of 17% units of glycidyl methylacrylate (evaluated by titration with hydrochloric acid); in case 4B after 24 hours, when the conversion is 84% and the content of units of glycidyl methylacrylate in the copolymer is 28%, and in case 4C after 55 hours, when the conversion is 55% and the content of units of glycidyl methylacrylate in the copolymer is 37.8%. The latices obtained after the finishing operations described in Example 2 have a pH of about 6.7 and are quite stable. The intrinsic "Vistex" viscosities at 30° C. in a toluene-isopropanol mixture (80:20 parts by volume) of polymers 4A, 4B, 4C, are 1.75; 1.185 and 0.925, respectively.

The latex of test 4A, brought to a concentration of solids of 15%, is used without any addition to impregnate a twisted high tenacity rayon (count denier 1650 x 2, 48 x 48 SZ twists per dm.).

After drying in air at 60° C., the twisted rayon is passed through a second liquid mixture prepared with 30 parts of butadiene-styrene rubber latex (having a 40% solid content), 30 parts of vinylpyridine rubber latex (also having a 40% solid content) and 8 parts of metaphenylenediamine dissolved in 32 parts of water. After a treatment of 10 minutes in air at 170° C. the twisted rayon, together with the natural rubber composition indicated in Example 1, is used to prepare the specimens which are vulcanized and subjected to the "axial pulling" test. By testing the specimens with a dynamometer at room temperature, the pulling force is 7.3 kg. (average result of 10 tests); (as a comparison, the rayon not treated with any adhesive gives a value of 4.2 kg.).

By operating in the same way with the latices of tests 4B and 4C, the mean pulling force is higher than 10.5 kg. and in most cases rupture of the twisted rayon and not its detachment from the rubber is observed. This can be attributed to the greater content of epoxy monomeric units of these copolymers.

EXAMPLE 5

For impregnation of a twisted polyethyleneterephthalate yarn a 10% aqueous solution of Aquarex D, as wetting agent, in an amount of 10%, a 50% aqueous dispersion of zinc oxide, in an amount of 6%, and a 60% aqueous dispersion of sulfur, in an amount of 1%, are added to the latex 4B of Example 4, adjusted to a content of 25% of solids. In this test the addition of Aquarex D is made to increase the amount of coating on said textile material due to the limited capacity of absorption of the polyethyleneterephthalate yarn.

The twisted polyethyleneterephthalate yarn (count denier 1100 x 2, 53 x 53 SZ twists per dm.) is passed through said liquid mixture and is then dried at about 60° C.; then it is passed through another mixture prepared with 30 parts of Polysar IV latex (having a 40% solid content), 30 parts of Gen-Tac latex (also having a 40% solid content), 8 parts of metaphenylenediamine in 32 parts of water and 6 parts of a 50% aqueous dispersion of zinc oxide. The final heat treatment of the textile is carried out in air at 170° C. and is prolonged for 2, 4, 6 or 8 minutes. The axial pulling test, effected on the specimens prepared and vulcanized as in the preceding examples, gives in every case an average value of the pulling force ranging between 7.3 and 7.7 kg.

By operating in the same way, still with a twisted polyester yarn and by using latex 4C, after a final heat treatment of the textile of 5 minutes at about 175° C. in air, the axial pulling test gives a mean force of 8.7 kg., and therefore higher than that obtained with latex 4B. This may be attributed to the higher content of epoxy monomeric units of the now used copolymer.

The twisted polyethyleneterephthalate yarn treated with latex 4C, as described above, is also subjected to a dynamic test, at a temperature higher than room temperature, to try its bonding to the natural rubber composition indicated in Example 1. In this case the specimen in analogous to that used for the static axial pulling tests at room temperature already described in Example 1, but has a width nine times greater and contains nine lengths of the same twisted yarn, spaced at regular intervals, embedded before curing in the rubber, each for a length of 1 cm., and kept under slight stretch during vulcanization.

The test is carried out by inserting the specimen into a metallic box having the same shape, provided with a hollow space through which flowing steam is passed in order to maintain the specimen at a temperature of 100° C.; said box is also provided with a slit of such a size that the ends of the various lengths of the twisted yarn may freely project. Each end is kept under tension by means of an axial load of 0.5 kg., to which an axial load variable from 0 to 2 kg. is superposed at a frequency of 350 cycles per minute.

The result of the text is expressed as the number of cycles required to obtain the total detachment from the rubber of 5 lengths of the twisted yarn out of the nine existing in the specimen.

The polyethyleneterephthalate twisted yarn, after the impregnation with the above said mixtures effected in a continuous operation, is subjected to a final treatment in an air-circulating oven in which the yarn passes at a speed of 3 m. per minute with a final period of 2 minutes at about 235° C.

The result of the test with the specimens prepared in this way is 1,400,000 cycles. The same test carried out on a twisted yarn not treated with any adhesive gives less than 2000 cycles.

EXAMPLE 6

The unsaturated epoxy copolymer used in this example results from the copolymerization in aqueous emulsion of the same monomers used for preparing the copolymer of Examples 4 and 5; however, the copolymerization is carried out by using Aquarex D instead of Nekal BX as an emulsifier.

The impregnation is carried out with two liquid mixtures analogous to those of the two cited examples; the hardening agents are both metaphenylenediamine and hexamethylenediamine.

The impregnated textile material is constituted by a polyethyleneterephthalate yarn.

The polymerization formulations used are the following:

| Test | 6A | 6B |
|---|---|---|
| Butadiene | 60 | 60 |
| Styrene | 15 | 15 |
| Glycidyl methylacrylate | 25 | 25 |
| Water | 180 | 180 |
| Aquarex D | 4 | 4 |
| Tamol N | 0.25 | 0.25 |
| DPXD | 0.09 | 0.06 |
| CHP | 0.28 | 0.19 |
| Rodite A | 0.2 | 0.2 |

In test 6A, three-fifths of glycidyl methylacrylate and two-thirds of DPXD and of CHP are added at the beginning; the remaining parts of these ingredients are added 4½ hours later.

In test 6B, two-fifths of the glycidyl methylacrylate and two-thirds of CHP are added at the beginning; the remaining parts of these ingredients are added 2 hours later.

The polymerization is carried out at 30° C. in the previously described way. In case 6A it is shortstopped after 7 hours, at a conversion of 77% and in case 6B after 8 hours, at a conversion of 78%. The contents of epoxy units in the copolymers are 24.2% and 24.3%, respectively. The intrinsic "Vistex" viscosities at 30° C. in a toluene-isopropanol mixture (80:20 parts by volume) of polymers 6A and 6B are 1.315 and 1.59, respectively.

Dispersions of zinc oxide and sulfur, in the ratios indicated in Example 2, are added to the latices brought to a solid concentration of about 25%. Then polyethyleneterephthalate twisted yarns (count denier 1100 x 2, 53 x 53 SZ twists per dm.) are dipped into said mixture. After a drying of 2–3 minutes in air at about 50° C., a part of the so treated twisted yarns is further dipped into a mixture of butadiene-styrene rubber latex (30 parts) and vinylpyridine rubber latex (30 parts), both having a 40% solids content to which metaphenylenediamine (8 parts in 32 parts of water) is added as a hardening agent. The remaining part of the already treated twisted yarns is instead dipped into a mixture the same as the preceding one, to which hexamethylenediamine is added as a hardening agent in the same amount.

After the subsequent heat treatment in air at 175° C. for 5 minutes, the results of the axial pulling test in respect of specimens constituted by the natural rubber composition employed in the preceding examples, and vulcanized for 60 minutes at 143° C., are the following:

| Test | M(6A) kg. | M(6B) kg. |
|---|---|---|
| Hardening agent: | | |
| Metaphenylenediamine | 8.5 | 8 |
| Hexamethylenediamine | 7.7 | 9 |

By carrying out the treatment of the twisted yarn in a continuous way, and in particular by carrying out the final treatment in an air-circulating oven, where the yarn passes at a speed of 3 m. per minute, with a final period of 2 minutes at about 215° C., the average values of the pulling force are:

| Test | M(6A) kg. | M(6B) kg. |
|---|---|---|
| Hardening agent: | | |
| Metaphenylenediamine | 10.3 | 7.8 |
| Hexamethylenediamine | 9.5 | 8.4 |

Values of the pulling force of about 8 kg. are instead obtained by carrying out the final heat treatment at a temperature of 235° C. for 2 minutes.

The twisted yarns already subjected to heat treatment for 2 minutes at 215° C. are also subjected to dynamic tests to try the bond to the natural rubber composition at a temperature higher than room temperature, as described in the preceding example. The results of these tests are:

| Test | M(6A) | M(6B) |
|---|---|---|
| Hardening agent: | Cycles | Cycles |
| Metaphenylenediamine | 835,000 | 600,000 |
| Hexamethylenediamine | 680,000 | 450,000 |

The same twisted yarn, not treated with adhesive, gives in the same test less than 2000 cycles.

In these tests the amount of the adhesive on the twisted yarn is the following: after the first bath, 9% based on the weight of the yarn; after both treatments, 15% based on the weight of the yarn.

In test M(6A), by operating at such a speed and tension of the yarn in the bath that the amount of adhesive on the yarn, after each dipping, is about 3% by weight (that is 6% in total) and by carrying out the final heat treatment in air at 215° C. for 2 minutes, the average results of the static axial pulling test are the following:

| Hardening agent: | Kg. |
|---|---|
| Metaphenylenediamine | 8.7 |
| Hexamethylenediamine | 10.5 | while 485,000 and 625,000 cycles are respectively reached in the dynamic test.

EXAMPLE 7

The impregnation of the textile material is effected with a single liquid mixture prepared by taking 100 parts of latex 6B of Example 6, brought to a solids concentration of 30%, 6 parts of a 50% aqueous dispersion of zinc oxide, 1 part of a 60% aqueous dispersion of sulfur, and a solution of 4 parts of dicyandiamide in 20 parts of water, this latter solution being prepared at about 50° C.

The impregnated textile material is a high tenacity rayon having count and twists as indicated above. The final heat treatment is carried out for 5 minutes at 175° C. The result of the static axial pulling test (rubber composition and vulcanization as already stated) is 8.1 kg.

The pulling force increases to over 11 kg. when lengths of twisted yarn impregnated with the above described mixture and dried in air at about 50° C. are subjected to a further impregnation with a mixture constituted by butadiene-styrene and vinylpyridine rubber latices in equal parts and by zinc oxide added in dispersion, the total solids of the rubbers being 24% and the zinc oxide being 3% based on the total weight of the mixture followed by a final heat treatment carried out at 175° C. for 5 minutes.

EXAMPLE 8

By carrying out the impregnation as in Example 7, the textile material being a polyhexamethyleneadipamide yarn having count and twists as indicated above and the mixture being the first of the two reported in said example, the pulling force is 5.6 kg. By carrying out the impregnation with the two mixtures the pulling force increases to 8 kg.

EXAMPLE 9

The impregnation of the textile material is effected with a single liquid mixture, prepared by taking 100 parts of latex 6B of Example 6, brought to a solids concentration of 30%, 6 parts of a 50% aqueous dispersion of zinc oxide, 1 part of a 60% aqueous dispersion of sulfur, and moreover, optionally:

(1) 4 parts of metaphenylenediamine in 20 parts of water, or
(2) 30 parts of vinylpyridine rubber latex (Gen-Tac) having a 40% solids content, stabilized with 2 parts of non-ionic emulsifier dissolved in 10 parts of water and brought with 2 N acetic acid to a pH in a range between 6 and 7, or
(3) 30 parts of vinylpyridine rubber latex stabilized and brought to a pH in a range between 6 and 7, as said under (2) and 4 parts of dicyandiamide, dissolved in 20 parts of hot water, or (4) 30 parts of vinyl pyridine rubber latex stabilized and brought to a pH in a range between 6 and 7, as said under (2), and 4 parts of metaphenylenediamine dissolved in 20 parts of water.

The textile material is a high tenacity rayon having count and twists as already indicated. The final heat treatment is carried out for 5 minutes at 175° C. The mean static pulling force at room temperature, obtained with the above described mixtures (rubber composition and vulcanization as already indicated) is respectively:

| Mixture: | Kg. |
|---|---|
| 1 | 7 |
| 2 | 9 |
| 3 | 9.9 |
| 4 | 9.6 |

EXAMPLE 10

The treatment of a twisted polyhexamethyleneadipamide yarn having count and twists as already indicated, under the conditions reported in Example 9, gives the following results:

| Mixture: | Kg. |
|---|---|
| 1 | 6 |
| 2 | 6.9 |
| 3 | 8.3 |
| 4 | 8 |

EXAMPLE 11

The treatment of a twisted polyethylene terephthalate yarn, having count and twists as already indicated, under the conditions reported in Example 9, gives the following results:

| Mixture: | Kg. |
|---|---|
| 1 | 4.7 |
| 2 | 7.7 |
| 3 | 5 |
| 4 | 6.5 |

EXAMPLE 12

The unsaturated epoxy copolymer used in this example is prepared by copolymerization in aqueous emulsion of the monomers employed in Example 6 and with the same other ingredients.

The impregnation of the textile material, constituted by a polyethyleneterephthalate yarn, is carried out with a single liquid mixture comprising said copolymer.

In this case the polymerization formulation is the following:

| Test: | Parts |
|---|---|
| Butadiene | 17 |
| Styrene | 15 |
| Glycidyl methacrylate | 38 |
| Water | 180 |
| Aquarex D | 4 |
| Tamol N | 0.25 |
| DPXD | 0.06 |
| CHP | 0.28 |
| Rodite A | 0.2 |

All the ingredients are added at the same time.

The polymerization is carried out in the usual way, and a conversion of 91% is reached after 3 hours.

The content of epoxy units in the copolymer is 32%. The intrinsic "Vistex" viscosity at 30° C. in a toluene-isopropanol mixture (80:20 parts by volume) is 1.16. The latex is brought to a solids content of 40%.

Eight parts of a 50% aqueous dispersion of zinc oxide, 1.2 parts of a 60% aqueous dispersion of sulfur, 35 parts of vinylpyridine rubber latex (having a 40% solids content), previously stabilized with 2 parts of a condensation product of a cyclic olefinic oxide with oleic alcohol in 6 parts of water and brought to a pH in a range between 6 and 7 with 2 N acetic acid, and 4 parts of metaphenylenediamine in 16 parts of water, are added to 100 parts of the latex.

The twisted polyethyleneterephthalate yarn, having count and twists as previously stated, is impregnated with the freshly prepared liquid mixture in the following way: the yarn is first passed in a continuous operation at a speed of 2 m. per minute, subjected to a stretch of 10% in an air-circulating oven at 220° C., where it remains 90 seconds; it is then passed into the above described mixture and finally subjected to a heat treatment in an oven analagous to the first for 90 seconds while subjected to a controlled shrinkage of 5%.

The dry residue applied on the textile material is about 6% based on the weight of the polyethyleneterephthalate yarn.

The mean value of the pulling force (rubber composition and vulcanization as already indicated) is 10.8 kg.

EXAMPLE 13

This example shows the possibility of obtaining a bond between textile materials and rubber compositions even in the absence of hardening agents, by using an unsaturated epoxy copolymer containing carboxy groups in its molecule. This copolymer is obtained by polymerizing butadiene, glycidyl, methylacrylate, styrene and methylacrylic acid in aqueous emulsion.

The impregnation is carried out either by means of a single liquid mixture or by means of two liquid mixtures.

The impregnated textile material is constituted by a twisted polyethyleneterephthalate yarn having count and twists as already indicated.

The polymerization formulation is the following:

| | Parts |
|---|---|
| Butadiene | 60 |
| Styrene | 13 |
| Glycidyl methylacrylate | 25 |
| Glacial methylacrylic acid | 2 |
| Water | 180 |
| Aquarex D | 4 |
| Tamol N | 0.25 |
| DPXD | 0.06 |
| CHP | 0.28 |
| Rodite A | 0.2 |

The pH of the solution of the emulsifiers to which the methylacrylic acid is added (initially 3.5) is brought to 5.3 with a 2 N solution of sodium hydroxide. In the final mixture the pH ranges between 6 and 8.

The operation is carried out as in the preceding examples.

Three-fifths of glycidyl methylacrylate are added at the beginning and two-fifths 2 hours later; two-thirds of CHP are added at the beginning and one-third 2 hours later.

The polymerization is shortstopped after 8 hours, when the conversion is 68% and the content of monomeric epoxy units in the polymer is 22.5% by weight. The intrinsic "Vistex" viscosity of the copolymer at 30° C. in a toluene-isopropanol mixture (80:20 parts by volume) is 1.5 100 ml./g.

Six parts of a 50% aqueous dispersion of zinc oxide and 1 part of a 60% aqueous dispersion of sulfur are added to the resulting latex, brought to a solids content of about 25%. Lengths of the twisted polyethyleneterephthalate yarn having count and twists as previously stated are dipped into the mixture. One of said lengths after drying in hot air at about 50° C. is dipped into another liquid mixture prepared with 30 parts of butadiene-styrene rubber latex, 30 parts of vinylpyridine rubber latex (both having a 40% solids content), and 8 parts of metaphenylene-diamine in 32 parts of water; another twisted yarn is treated with an analogous mixture, to which metaphenylenediamine is not added. A heat treatment of 2 minutes in air at 230° C. is subsequently effected in both cases. The coating amount on the twisted yarn is in both cases about 5.56–6% by weight. The specimens prepared with the natural rubber composition, the formulation of which is indicated in Example 1 and vulcanized for 60 minutes at 143° C. give at room temperature mean static pulling forces of 7.6 kg. with the twisted yarn treated in the presence of metaphenylenediamine, and 1.5 kg. with the yarn treated in the absence of this hardening agent. The twisted yarn not treated with adhesive gives a mean pulling force of 2.4 kg.

Values near to those obtained in the absence of the hardening agent are obtained by carrying out the impregnation with the first mixture only and with the same heat treatment of 2 minutes at 230° C.

EXAMPLE 14

This example illustrates the possibility of obtaining a very good bond between textile materials and rubber compositions by the use of an unsaturated epoxy copolymer derived from copolymerization in aqueous emulsion of butadiene and the gylcidyl ether of orthovinylphenol.

The two liquid mixtures, the first of which contains only the latex of the copolymer, are used.

The impregnated textile material is a high tenacity rayon.

The polymerization formulations used to obtain the unsaturated epoxy copolymer are the following:

| Test | 14A | 14B |
|---|---|---|
| Butadiene | 85 | 50 |
| Glycidyl ether of orthovinylphenol | 15 | 34 |
| Water | 190 | 190 |
| Nekal BX | 4 | 4 |
| Tamol N | 0.25 | 0.25 |
| DPXD | 0.1 | 0.1 |
| CHP | 0.42 | 0.56 |
| Rodite A | 0.4 | 0.4 |
| Benzene | | 22 |

In test 6A the glycidyl ether of ortho-vinylphenol is entirely added at the beginning; in test 6B two-thirds are added at the beginning and one-third 8 hours later. In test 6A, one-third of CHP is added at the beginning, one sixth 3½ and 5½ hours later, and one-third 8 hours later; in test 6B one-fourth is added at the beginning and one-fourth respectivedly 2, 8 and 24 hours later. In both tests, Rodite A is added one-half at the beginning and one-half 8 hours later. The addition of benzene in test 14B serves to improve the mixing of the two monomers.

The operation is carried out as already indicated and at a temperature of 30° C. It is shortstopped after 32 hours at a conversion of 61% in test 14A, and at a conversion of 56% in test 14B. The content of epoxy monomeric units in the copolymers is 15% and 47% by weight, respectively. The intrinsic "Vistex" viscosities of polymers 14A and 14B at 30° C. in a toluene-isopropanol mixture (80:20 parts by volume) are 0.775 and 0.875, respectively. After the usual finishing operations the polymers are brought to a solids content of about 15% and are used without further additions to impregnate lengths of twisted high tenacity rayon yarn having count and twists as stated above. After drying in air at 60° C. both the twisted yarns treated with latex 14A and those treated with latex 14B are passed into a second liquid mixture constituted by butadiene-styrene rubber latex and vinylpyridine rubber latex, in equal amounts, and by metaphenylenediamine, said mixture being such that the concentration of each rubber is 8% and the concentration of the amine is 6% in every case based on the weight of the mixture. The twisted lengths are then kept for 15 minutes at 160° C. The mean pulling force of the specimens made of natural rubber (composition and vulcanization as already indicated) and prepared with the yarn treated with latex 14A is 8.8 kg. and the mean pulling force of the specimens prepared with the yarn treated with latex 14B is more than 10 kg. and often higher than the breaking load of the twisted yarn.

If in the case of the twisted yarn treated with latex 14B, the second mixture, instead of containing vinylpyridine rubber, contains only butadiene-styrene rubber, the mean pulling force decreases to 5.8 kg.

EXAMPLE 15

By impregnating a twisted polyhexamethyleneadipamide yarn, having count and twists as already indicated, with latex 14B and then with the mixture of butadiene-styrene rubber latex and vinylpyridine rubber latex and of metaphenylenediamine as in Example 14, and by subjecting the specimen to a final heat treatment for 15 minutes at 180° C., the mean pulling force in the static test at room temperature under the above indicated conditions is 7.4 kg. (with an untreated twisted yarn 2.4 kg.).

EXAMPLE 16

By impregnating a twisted polyethyleneterephthalate yarn having count and twists as previously indicated with latex 14B and then with the mixture of butadiene-styrene rubber latex and vinylpyridine latex rubber and metaphenylenediamine as in Example 14, and by subjecting the specimen to a final heat treatment for 15 minutes at 180° C., the mean pulling force in the static test is 5.8 kg. (with an untreated twisted yarn 2.3 kg.). Quite analogous results are obtained by replacing the metaphenylenediamine with equal amounts of triethylenetetramine, or hexamethylenediamine, or triethanolamine, or also with a boron trifluoridemonoethylamine complex which, however, considerably destabilizes the latices of the mixture, so as to start their rapid coagulation.

Very good hardening agents are also melamine, benzoguanamine, tolydine, dianisidene, metatoluylenediamine, diaminodiphenylmethane and diaminodiphenylsulphone.

EXAMPLE 17

This example illustrates the possibility of using the polymers of the present invention to obtain a very good bond of textile materials to natural rubber compositions different from that already indicated as well as to compositions of other rubbers, in particular butadiene-styrene, butadiene-acrylonitrile, polybutadiene having a high percentage of 1,4 cis units, and polychloroprene.

Twisted polyethyleneterephthalate yarn having count and twists as previously indicated and impregnated with the latex of the butadiene-styrene-glycidyl methylacrylate copolymer having a 30% solid content prepared as in Example 6B, to which zinc oxide and sulfur are added, as already stated, is used in all cases, After drying in air at about 50° C. some lengths of the so treated yarn are passed into the second mixture of butadiene-styrene rubber latex and vinylpyridine rubber latex indicated in Example 6, containing metaphenylenediamine, and other lengths into the analogous mixture containing hexamethylenediamine. A heat treatment in air for 10 minutes at 180° C. is subsequently effected in both cases.

As already described, specimens to be subjected to the static pulling test are prepared with the compositions of the different rubbers indicated in the following table, and vulcanized in every case for 80 minutes at 143° C. The table also reports the Shore A hardness of the so vulcanized compositions.

| | 1 | 2 | 3 | 4 | 5 |
|---|---|---|---|---|---|
| Natural rubber | 100 | | | | |
| Butadiene-styrene SBR 1500 rubber | | 100 | | | |
| 1,4 cis polybutadiene (95%) | | | 100 | | |
| Neoprene WRT [1] | | | | 100 | |
| Polysar Krinac 803 [2] | | | | | 100 |
| Phenylbetanaphthylamine | 1 | 1 | 1 | 1 | 1 |
| HAF furnace black | | 30 | 35 | | |
| SRF furnace black | 25 | | | 25 | 30 |
| Pine tar | 2 | | | | 5 |
| Aromatic mineral oil | | 6.5 | | | |
| Naphthenic mineral oil | | | 5 | 8 | |
| Disproportioned rosin | | | 5 | | |
| Zinc oxide | 4 | 5 | 3 | 5 | 4 |
| Magnesium oxide | | | | 4 | |
| Stearic acid | 2.5 | 2.5 | 2 | | 1 |
| Mercaptobenzothiazole | 1 | | | | |
| N-cyclohexyl-benzothiazyl-2-sulphenamide | | 1.1 | | | |
| N-oxydiethylene-benzothiazyl-2-sulphenamide | | | 0.85 | | |
| Tetramethylthiuram-monosulphide | | | | 0.8 | |
| Diorthotolylguanidine | | | | 0.8 | |
| Dibenzothiazyl disulphide | | | | | 1.5 |
| Sulfur | 2.8 | 2 | 1.75 | 1 | 1.5 |
| Shore A hardness | 54 | 53 | 57 | 49 | 47 |

[1] Copolymer of chloroprene, of E. I. du Pont de Nemours & Company.
[2] Butadiene-acrylonitrile rubber, having an acrylonitrile content of 30%, of Polymer Corporation, Sarnia.

At room temperature the static pulling forces corresponding to the so treated lengths of twisted yarn in comparison with those corresponding to the lengths of twisted yarn not treated with adhesive (mean values of 10 tests) are indicated in the following table:

| | Not treated twisted yarn (kg.) | Twisted yarn treated with adhesive containing metaphenylenediamine (kg.) | Twisted yarn treated with adhesive containing hexamethylenediamine (kg.) |
|---|---|---|---|
| Compound: | | | |
| 1 | 1.5 | 7.3 | 7.0 |
| 2 | 3.0 | 6.9 | 6.8 |
| 3 | 1.0 | 9.8 | 8.6 |
| 4 | 1.7 | 7.2 | 7.3 |
| 5 | 4.2 | 9.5 | 10.0 |

Conventional pneumatic tires for motor vehicles manufactured by using compositions based on natural rubber and butadiene-styrene rubber and reinforced in particular with a twisted polyethyleneterephthalate yarn treated according to the process for improving the bond of textile material to rubber, according to the present invention, show exceptional mileage without detachments or ruptures of the composite structure. This result is by far better than those obtained with pneumatic tires reinforced with the same twisted polyethyleneterephthalate yarn treated according to processes heretofore used to bond such a textile material to rubber compositions.

What is claimed is:

1. A process for improving the bonding of textile material to rubber comprising the steps of impregnating a textile material before its bonding to rubber with a liquid mixture comprising unsaturated epoxy copolymer comprising in its structure monomeric units having double bonds between carbon atoms and monomeric units having pendant epoxy groups, said copolymer being obtained by free-radical copolymerization, in a substantially neutral medium, of at least one conjugated diene monomer with at least one alkenyl monomer containing epoxy groups, said epoxy groups after copolymerization being pendant with respect to the molecular chain of the obtained copolymer, the monomeric units comprised in the structure of said copolymer being present in a ratio by weight of copolymer ranging between 2% and 95% with respect to the monomeric units containing double bonds between carbon atoms and between 5% and 60% with respect to the monomeric units containing epoxy groups, drying the treated textile material at temperatures not higher than 120° C. so as to obtain the practically total elimination of the liquid medium, submitting the dry textile material to a heat treatment at a temperature in the range between 120° C. and 240° C. for a time in the range between 0.5 and 30 minutes in order to obtain at least partial cross-linking of the epoxy groups on the textile material, contacting the rubber to be bonded directly with the dried impregnated textile material, and vulcanizing the thus produced composite structure.

2. A process as defined in claim 1, in which the textile material is constituted by regenerated cellulose.

3. A process as defined in claim 1, in which the textile material is constituted by a polyamide resin.

4. A process as defined in claim 1, in which the textile material is constituted by a polyester resin.

5. A process as defined in claim 1, in which the impregnation of the textile material is carried out by means of a liquid mixture comprising besides the unsaturated epoxy copolymer at least one cross-linking agent.

6. A process as defined in claim 5, in which at least one cross-linking agent is an epoxy resin hardener having a chemical functionality such as to be able to carry out a cross-linking action on the epoxy groups, the total of said cross-linking agents being present in a ratio up to 30% by weight based on the total content of the unsaturated epoxy copolymer.

7. A process as defined in claim 5, in which at least one cross-linking agent is constituted by a copolymer comprising monomeric units derived from monomers selected from the group consisting of vinylpyridines and their homologues, the total of said copolymer being present in a ratio up to 70% by weight based on the total content of the unsaturated epoxy copolymer.

8. A process as defined in claim 5, wherein said liquid mixture also includes polymeric elastomers selected from the group consisting of natural rubber and synethic rubbers having a high degree of unsaturation, the total of said rubbers being present in a ratio up to 50% by weight based on the total content of the unsaturated epoxy copolymer.

9. A process as defined in claim 5, wherein said liquid mixture also includes polymeric resinous substances selected from the group consisting of phenolic, epoxy and polyamidic resins, the total of said resins being present in a ratio up to 30% by weight based on the total content of the unsaturated epoxy copolymer.

10. A process as defined in claim 5, wherein the unsaturated epoxy copolymer is in dispersion in an aqueous medium, water-insoluble cross-linking agents and any other water-insoluble additives are in dispersion in an aqueous medium, water-soluble cross-linking agents and other water-soluble additives are in aqueous solution, and the pH of each dispersion and solution in aqueous medium before mixing to form the liquid mixture is between 6 and 8.5.

11. A process as defined in claim 5, in which the unsaturated epoxy copolymer is in solution in an inert organic solvent medium, and the cross-linking agents and any other additives are added, in solution or in dispersion, in an inert organic medium compatible with the preceding one, to form the liquid mixture.

12. A process as defined in claim 5, in which at least one cross-linking agent is a vulcanizing agent having a chemical functionality such as to be able to carry out a cross-linking action by means of the double bonds of the unsaturated epoxy copolymer, the total of said vulcanizing agents being in a ratio up to 10% by weight based on the total content of the unsaturated epoxy copolymer.

13. A process as defined in claim 12, in which in addition to the vulcanizing agent there is present vulcanization accelerators and vulcanization coadjutants, the total of said accelerators being present in a ratio up to 5% by weight based on the total content of the unsaturated epoxy copolymer, and the total of said coadjutants being present in a ratio up to 25% by weight based on the total content of the unsaturated epoxy copolymer.

14. A process as defined in claim 1, wherein said unsaturated epoxy copolymer is prepared by copolymerization also with an alkenyl monomer devoid of epoxy groups and thus includes in its structure monomeric units devoid of double bonds between carbon atoms and of epoxy groups in a ratio of 0.1 to 40% by weight based on the total weight of said unsaturated epoxy copolymers.

15. A process as defined in claim 14, in which the impregnation of the textile material is carried out by means of a liquid mixture comprising besides the unsaturated epoxy copolymer at least one cross-linking agent.

16. A process as defined in claim 15, in which at least one cross-linking agent is an epoxy resin hardener having a chemical functionality such as to be able to carry out a cross-linking action on the epoxy groups, the total of said cross-linking agents being present in a ratio up to 30% by weight based on the total content of the unsaturated epoxy copolymer.

17. A process as defined in claim 15, in which at least one cross-linking agent is constituted by a copolymer comprising monomeric units derived from monomers selected from the group consisting of vinylpyridines and their homologues, the total of said copolymer being present in a ratio up to 70% by weight based on the total content of the unsaturated epoxy copolymer.

18. A process as defined in claim 15, in which the unsaturated epoxy copolymer comprises in its structure monomeric units having a chemical functionality such as to be able to carry out a cross-linking action on at least a part of the epoxy groups, said monomeric units being devoid of double bonds between carbon atoms and of epoxy groups and being derived from at least one monomer selected from the group consisting of acrylic, alpha-chloroacrylic, alpha-methylacrylic, alpha-ethylacrylic, alpha-propylacrylic, alpha-butylacrylic acids, and vinylpyridines and their homologues.

19. A process as defined in claim 15, wherein said liquid mixture also includes polymeric elastomers selected from the group consisting of natural rubber and synthetic rubbers having a high degree of unsaturation, the total of said rubbers being present in a ratio up to 50% by weight based on the total content of the unsaturated epoxy copolymer.

20. A process as defined in claim 15, wherein said liquid mixture also includes polymeric resinous substances selected from the group consisting of phenolic, epoxy and polyamidic resins, the total of said resins being present in a ratio up to 30% by weight based on the total content of the unsaturated epoxy copolymer.

21. A process as defined in claim 15, wherein the unsaturated epoxy copolymer is in dispersion in an aqueous medium, water-insoluble cross-linking agents and any other water-insoluble additives are in dispersion in an aqueous medium, water-soluble cross-linking agents and other water-soluble additives are in aqueous solution, and the pH of each dispersion and solution in aqueous medium before mixing to form the liquid mixture is between 6 and 8.5.

22. A process as defined in claim 15, in which the unsaturated epoxy copolymer is in solution in an inert organic solvent medium, and the cross-linking agents and any other additives are added, in solution or in dispersion, in an inert organic medium compatible with the preceding one, to form the liquid mixture.

23. A process as defined in claim 15, in which at least one cross-linking agent is a vulcanizing agent having a chemical functionality such as to be able to carry out a cross-linking action by means of the double bonds of the unsaturated epoxy copolymer, the total of said vulcanizing agents being in a ratio up to 10% by weight based on the total content of the unsaturated epoxy copolymer.

24. A process as defined in claim 23, in which in addition to the vulcanizing agent there is present vulcanization accelerators and vulcanization coadjutants, the total of said accelerators being present in a ratio up to 5% by weight based on the total content of the unsaturated epoxy copolymer, and the total of said coadjutants being present in a ratio up to 25% by weight based on the total content of the unsaturated epoxy copolymer.

References Cited

UNITED STATES PATENTS

| | | | |
|---|---|---|---|
| 1,567,506 | 12/1925 | Hopkinson | 260—743 |
| 2,429,223 | 10/1947 | Eustis et al. | 117—122 |
| 3,231,412 | 1/1966 | Pruitt et al. | 117—76 |
| 3,308,007 | 3/1967 | Shepard | 161—170 |
| 2,902,398 | 9/1959 | Schroeder | 156—315 |
| 3,222,238 | 12/1965 | Krysiak | 156—330 |
| 3,234,067 | 2/1966 | Krysiak | 156—330 |
| 3,247,043 | 4/1966 | Cardina | 156—314 |

FOREIGN PATENTS 788,381   1/1958   Great Britain.

OTHER REFERENCES

Barron: Modern Synthetic Rubbers, Chapman and Hall, London (1949) pp. 231–232.

EARL M. BERGERT, *Primary Examiner.*

W. E. HOAG, *Assistant Examiner.*

U.S. Cl. X.R.

117—76; 152—357; 156—110, 307, 331, 334